(12) United States Patent
Otani et al.

(10) Patent No.: US 12,518,238 B2
(45) Date of Patent: Jan. 6, 2026

(54) INFORMATION PROCESSING APPARATUS, INFORMATION PROCESSING METHOD, AND PROGRAM

(71) Applicant: NTT, Inc., Tokyo (JP)

(72) Inventors: Miwaka Otani, Musashino-shi (JP); Shingo Omata, Musashino-shi (JP); Ken Kanishima, Musashino-shi (JP)

(73) Assignee: NTT, Inc., Tokyo (JP)

( * ) Notice: Subject to any disclaimer, the term of this patent is extended or adjusted under 35 U.S.C. 154(b) by 316 days.

(21) Appl. No.: 18/553,772

(22) PCT Filed: Apr. 7, 2021

(86) PCT No.: PCT/JP2021/014745
§ 371 (c)(1),
(2) Date: Oct. 3, 2023

(87) PCT Pub. No.: WO2022/215188
PCT Pub. Date: Oct. 13, 2022

(65) Prior Publication Data
US 2024/0185164 A1    Jun. 6, 2024

(51) Int. Cl.
*G06Q 10/067* (2023.01)
(52) U.S. Cl.
CPC .................. *G06Q 10/067* (2013.01)
(58) Field of Classification Search
CPC .................................................. G06Q 10/067
See application file for complete search history.

(56) References Cited

U.S. PATENT DOCUMENTS 10,021,138 B2 * 7/2018 Gill ..................... H04L 63/1416
10,067,749 B2 * 9/2018 Birkenhauer ............. G06F 8/38
(Continued)

FOREIGN PATENT DOCUMENTS

CN          111694555 A  *  9/2020    ............. G06F 8/315

OTHER PUBLICATIONS

18553772_2025-09-06_CN_111694555_A_M (Year: 2020).*
(Continued)

*Primary Examiner* — Ziaul A Chowdhury
(74) *Attorney, Agent, or Firm* — Fish & Richardson P.C.

(57) ABSTRACT

An information processing device 1 generates an application architecture model and a data architecture model on the basis of a business architecture model in which a process and an object have been modeled on the basis of a business requirement. The information processing device 1 includes an API information storage unit 15 that holds information regarding industry standard APIs. For each business process included in the business architecture model, a recommended AA/DA calculation unit 19 extracts information regarding a business process and information regarding a business object used by the business process from the business architecture model. A recommended API calculation unit 20 calculates recommendation of the business process for each industry standard API. The recommended AA/DA calculation unit 19 generates an application architecture model and a data architecture model by building an AA element based on a name of the industry standard API having the highest recommendation, associating the AA element with the business process, building a DA element based on a name of a resource used by the industry standard API having the highest recommendation, and associating the DA element with the business object.

7 Claims, 14 Drawing Sheets

(56) References Cited

U.S. PATENT DOCUMENTS

| | | | | |
|---|---|---|---|---|
| 2008/0140601 A1* | 6/2008 | Mital | ................... | G06N 5/025 |
| | | | | 706/48 |
| 2009/0037197 A1* | 2/2009 | McCrae | ............... | G06Q 30/018 |
| | | | | 705/317 |
| 2012/0011079 A1* | 1/2012 | Kumaran | ............ | G06Q 10/067 |
| | | | | 705/348 |
| 2015/0082271 A1* | 3/2015 | Damonte | ................. | G06F 8/10 |
| | | | | 717/105 |

OTHER PUBLICATIONS

Opengroup.org [online], "Welcome to the TOGAF® Standard, Version 9.2, a standard of The Open Group—1. Introduction" available on or before Apr. 8, 2011, retrieved on Mar. 5, 2021, retrieved from URL<https://pubs.opengroup.org/architecture/togaf9-doc/arch/>, 1 page.

* cited by examiner

Fig. 2

| API ID | INDUSTRY STANDARD NAME | API NAME | API OVERVIEW | OPERATION | RESOURCE NAME | RESOURCE ID | RESOURCE OVERVIEW |
|---|---|---|---|---|---|---|---|
| 1 | TMF | Create Service Problem | This operation list service problem entities. Attribute selection is enabled for all first level attributes. Filtering may be available depending on the compliance level supported by an implementation. | get | ServiceProblem | 1 | The problem information for Middle B which is abstracted in the service layer from the issued event information by First B. |
| 2 | MEF | ... | ... | ... | ... | ... | ... |
| 3 | TMF | ... | ... | ... | ... | ... | ... |
| 4 | 3GPP | ... | ... | ... | ... | ... | ... |
| ... | ... | | | | | | |

Fig. 3

| RESOURCE ID | RESOURCE NAME | FIELD NAME | TYPE | FIELD OVERVIEW | SUB-RESOURCE ID |
|---|---|---|---|---|---|
| 1 | ServiceProblem | Priority | Integer | An indication varying from 1 (highest) to 10 (lowest) of how important it is for the service provider to correct the Service Problem. | - |
| 1 | ServiceProblem | Status | String | The current status of the service problem. Possible values are Submitted, Rejected, Acknowledged, In Progress [Held, Pending], Resolved, Closed, and Cancelled. | - |
| 1 | ServiceProblem | timeRaised | DateTime | Time the problem was raised. | - |
| 1 | ServiceProblem | underlying Alarm | AlarmRef[] | A list of alarms underlying this problem. | 5 |
| 2 | ... | ... | ... | ... | ... |
| ... | ... | ... | ... | ... | ... |
| 5 | AlarmRef | href | String | reference of the service. | ... |
| 5 | AlarmRef | Id | String | Unique identifier of the Alarm. | ... |

INFORMATION PROCESSING APPARATUS, INFORMATION PROCESSING METHOD, AND PROGRAM

CROSS-REFERENCE TO RELATED APPLICATIONS

This application is a National Stage application under 35 U.S.C. § 371 of International Application No. PCT/JP2021/014745, having an International Filing Date of Apr. 7, 2021, the disclosure of which is considered part of the disclosure of this application, and is incorporated by reference in its entirety into this application.

TECHNICAL FIELD

The present invention relates to an information processing device, an information processing method, and a program.

BACKGROUND ART

There is known a framework for formulating enterprise architecture by using a hierarchical structure of business architecture, data architecture, application architecture, and technology architecture (Non Patent Literature 1). In the framework of Non Patent Literature 1, architecture models are built in the following order: the business architecture, the application architecture and the data architecture, and the technology architecture.

CITATION LIST

Non Patent Literature

Non Patent Literature 1: "Welcome to the TOGAF Standard, Version 9.2", The Open Group, the Internet <URL:https://pubs.opengroup.org/architecture/togaf9-doc/arch/>

SUMMARY OF INVENTION

Technical Problem

In the framework of Non Patent Literature 1, it is recommended to use industry standards and current elements as much as possible in building of the application architecture and the data architecture. However, it is a huge burden to investigate information that can be used for building the application architecture and the data architecture from an enormous amount of information of the industry standards. Further, in a case where the current elements and the industry standards are used in combination, there is a high possibility that definitions of data thereof are partially inconsistent, which is problematic.

The present invention has been made in view of the above, and an object thereof is to more easily use industry standards and current elements in formulating enterprise architecture.

Solution to Problem

An information processing device according to an aspect of the present invention is an information processing device that generates an application architecture model and a data architecture model on the basis of a business architecture model in which a process and an object have been modeled on the basis of a business requirement, the information processing device including: a storage unit that holds information regarding industry standard APIs; and a generation unit that generates the application architecture model and the data architecture model by extracting, for each process included in the business architecture model, information regarding the process and information regarding the object used by the process from the business architecture model, calculating recommendation for each of the industry standard APIs, building an AA element based on a name of the industry standard API having the highest recommendation, associating the AA element with the process, building a DA element based on a name of a resource used by the industry standard API having the highest recommendation, and associating the DA element with the object.

An information processing method according to an aspect of the present invention is an information processing method of generating an application architecture model and a data architecture model on the basis of a business architecture model in which a process and an object have been modeled on the basis of a business requirement, in which: a computer holds information regarding industry standard APIs, and generates the application architecture model and the data architecture model by extracting, for each process included in the business architecture model, information regarding the process and information regarding the object used by the process from the business architecture model, calculating recommendation for each of the industry standard APIs, building an AA element based on a name of the industry standard API having the highest recommendation, associating the AA element with the process, building a DA element based on a name of a resource used by the industry standard API having the highest recommendation, and associating the DA element with the object.

Advantageous Effects of Invention

According to the present invention, it is possible to more easily use industry standards and current elements in formulating enterprise architecture.

BRIEF DESCRIPTION OF DRAWINGS

FIG. 2 illustrates an example of information regarding industry standard APIs held by an information processing device.

FIG. 3 illustrates an example of information regarding resources used by industry standard APIs held by an information processing device.

DESCRIPTION OF EMBODIMENTS

Hereinafter, an embodiment of the present invention will be described with reference to the drawings.

Figure 1:
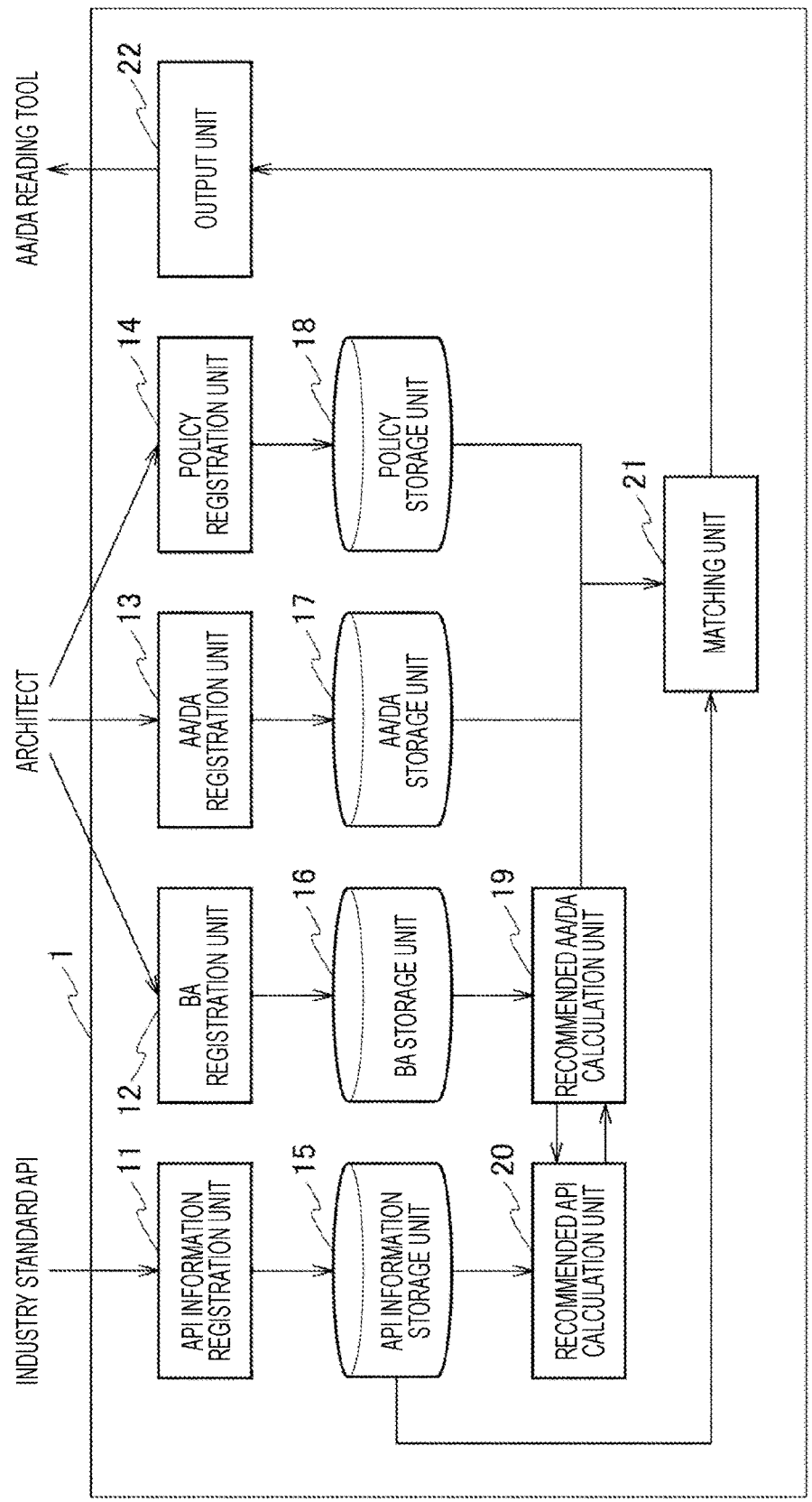
FIG. 1 is a functional block diagram illustrating an example of a configuration of an information processing device according to the present embodiment.

FIG. 1 is a functional block diagram illustrating an example of a configuration of an information processing device 1 according to the present embodiment. The information processing device 1 according to the present embodiment holds information regarding an industry standard application programming interface (API) and, when a business architecture model (hereinafter, referred to as "BA") in which a process and an object have been modeled on the basis of a business requirement is input, builds an application architecture (hereinafter, referred to as "AA") element and a data architecture (hereinafter, referred to as "DA") element to be associated with the BA on the basis of the industry standard API, thereby generating an application architecture model and a data architecture model (hereinafter, referred to as "AA/DA"). When specifying the industry standard API used for building the AA element and the DA element, the information processing device 1 extracts information regarding a business process and business object included in the BA and calculates recommendation of each API on the basis of similarity between the extracted information and information regarding each API. The information processing device 1 builds the AA element and the DA element on the basis of an API having the highest recommendation.

The information processing device 1 may input an AA element and DA element to be used as elements of the AA/DA for an ideal (To-Be) BA to the current (As-Is) AA/DA. That is, a function to be diverted from the current system may be input. At this time, the information processing device 1 may give information for matching a DA element built based on a resource of a recommended API with the DA element used from the As-Is.

The information processing device 1 in FIG. 1 includes an API information registration unit 11, a BA registration unit 12, an AA/DA registration unit 13, a policy registration unit 14, an API information storage unit 15, a BA storage unit 16, an AA/DA storage unit 17, a policy storage unit 18, a recommended AA/DA calculation unit 19, a recommended API calculation unit 20, a matching unit 21, and an output unit 22.

The API information registration unit 11 inputs information regarding an industry standard API and registers the information in the API information storage unit 15. The industry standard API is a standard specification defined by a standardization organization or the like and is a specification of an interface for using a device, a service, or the like. Examples of the industry standard API include the TeleManagement Forum (TMF) Open APIs, The 3rd Generation Partnership Project (3GPP) API, and the Metro Ethernet Forum (MEF) APIs. The APIs stored in the API information storage unit 15 are not limited thereto. Other industry standard APIs may be registered.

FIGS. 2 and 3 illustrate an example of information stored in the API information storage unit 15. FIG. 2 illustrates an example of information regarding the industry standard APIs. In the example of FIG. 2, an API record including an API ID, an industry standard name, an API name, an API overview, operation, a resource ID, and a resource overview is registered for each API in the API information storage unit 15. The API ID indicates an identifier for specifying the API in the information processing device 1. The industry standard name indicates a name of an industry standard defining the API. The API name indicates a name of the API. The API overview indicates description of a function and the like of the API. The operation indicates an operation (get, post, patch, or delete) on a resource. The resource ID indicates an identifier for specifying the resource used by the API. The resource overview indicates description of the resource used by the API.

FIG. 3 illustrates an example of information regarding resources used by the industry standard APIs. In the example of FIG. 3, a resource record including a resource ID, a resource name, a field name, a type, a field overview, and a sub-resource ID is registered for each field included in the resource in the API information storage unit 15. The resource ID indicates an identifier for specifying the resource in the information processing device 1 and corresponds to the resource ID of the API record. The resource name indicates a name of the resource. The field name indicates a name of the field included in the resource. The type indicates the type of data of the field. The field overview indicates description of the field. The sub-resource ID indicates a resource ID indicating a resource associated with the field.

The BA registration unit 12 inputs a To-Be BA created by an architect and registers the BA in the BA storage unit 16. For example, the architect creates a BA by using a tool and inputs the created BA to the BA registration unit 12. The recommended AA/DA calculation unit 19 and the recommended API calculation unit 20 described later form a generation unit and generate a To-Be AA/DA corresponding to the To-Be BA input by the BA registration unit 12.

Figure 4:
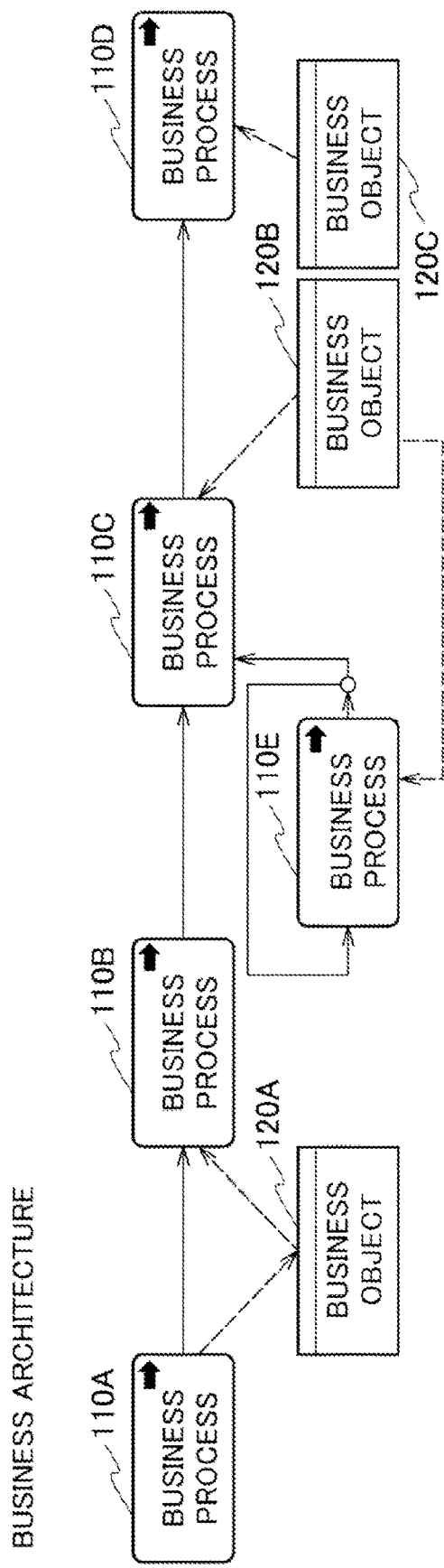
FIG. 4 illustrates an example of a business architecture model.

FIG. 4 illustrates an example of the To-Be business architecture model. In the example of FIG. 4, the BA includes five business processes 110A to 110E and three business objects 120A to 120C. The business processes are a procedure for implementing a vision to be achieved. The business objects are information used by the business processes. Use directions (read or write) of the business objects by the business processes are indicated by arrows. For example, in the BA of FIG. 4, the business process 110A generates the business object 120A, and the business process 110B uses the business object 120A.

The AA/DA registration unit 13 inputs the AA element and the DA element to be used for the To-Be among the As-Is AA/DA, registers the AA element and the DA element in the AA/DA storage unit 17, and associates the AA element and the DA element to be used for the To-Be with the To-Be BA. The To-Be BA is stored in the BA storage unit 16. The As-Is AA/DA is a model of the current system. For example, the architect registers the AA element and DA element corresponding to an application or the like in the current system and to be also used for the To-Be as the AA element and DA element to be used for the To-Be and associates the AA element and the DA element with the To-Be BA.

Figure 5:
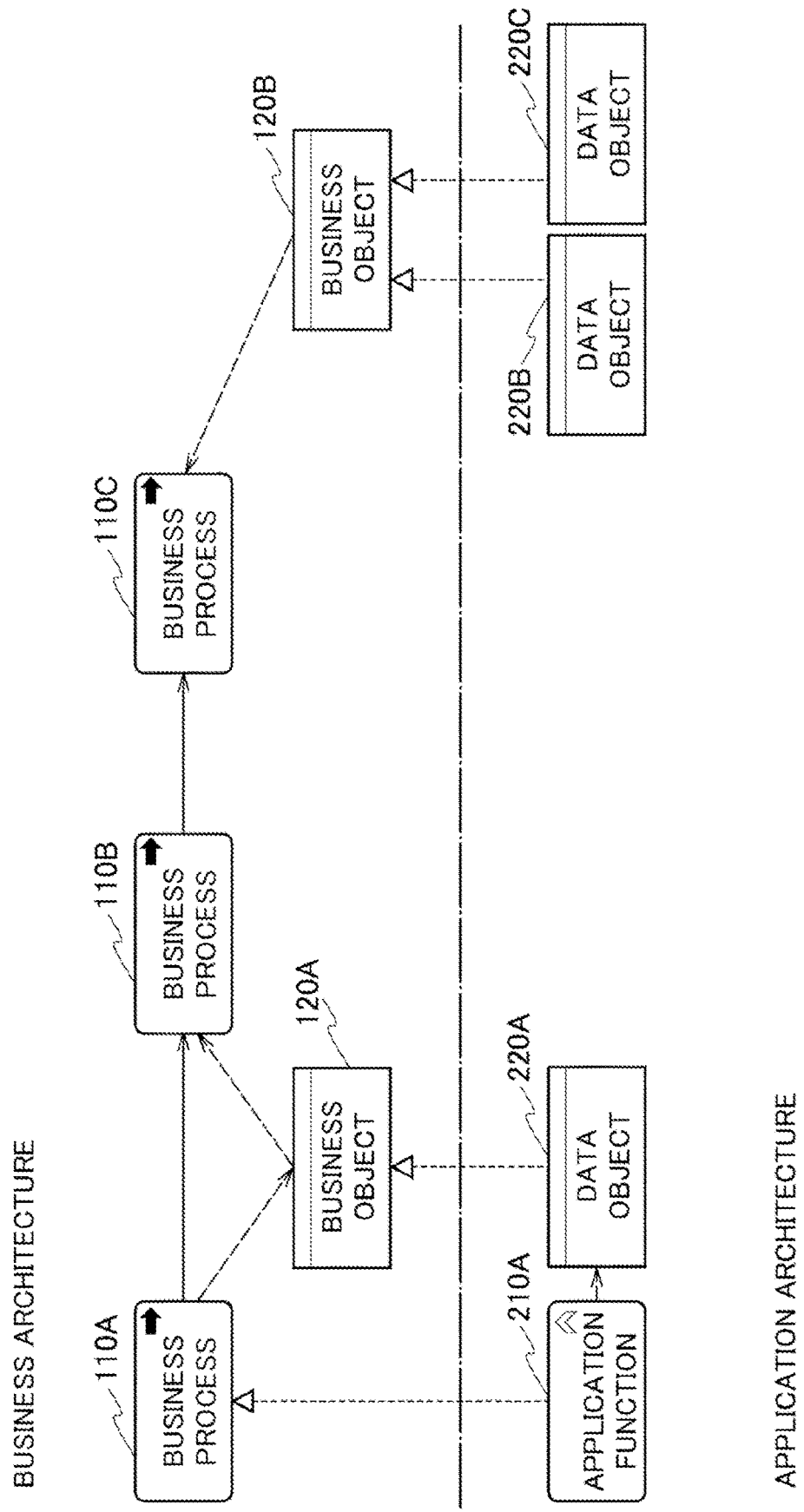
FIG. 5 illustrates an example of an application architecture model.

FIG. 5 illustrates an example of an As-Is application architecture model. The example of FIG. 5 shows an application function 210A and three data objects 220A to 220C to be used for the To-Be. The application function 210A is the AA element, and the data objects 220A to 220C are the DA elements. FIG. 5 also illustrates the As-Is BA.

The policy registration unit 14 inputs a policy indicating which is considered to be more important, the As-Is DA element or the DA element built based on the resource of the recommended API, and registers the policy in the policy storage unit 18. The policy is referred to when the matching unit 21 described later matches the As-Is DA element.

The recommended AA/DA calculation unit 19 builds the AA element and the DA element to be associated with the business processes and business objects included in the To-Be BA on the basis of the recommended API obtained by the recommended API calculation unit 20, thereby generating AA/DA. More specifically, the recommended AA/DA calculation unit 19 extracts information regarding the business processes and information regarding the business objects used by the business processes from the BA for each business process included in the To-Be BA and transmits the extracted information to the recommended API calculation unit 20. The information transmitted by the recommended AA/DA calculation unit 19 to the recommended API calculation unit 20 is, for example, a business process name, a business process overview, a business object name, a business object overview, and a use direction (read or write) of the business object. Based on information regarding the API record of the recommended API returned from the recommended API calculation unit 20, the recommended AA/DA calculation unit 19 builds an application function to which the industry standard name and the API name have been given, associates the application function with the business process, builds a data object to which the industry standard name and the resource name have been given, and associates the data object with the business object.

Figure 6:
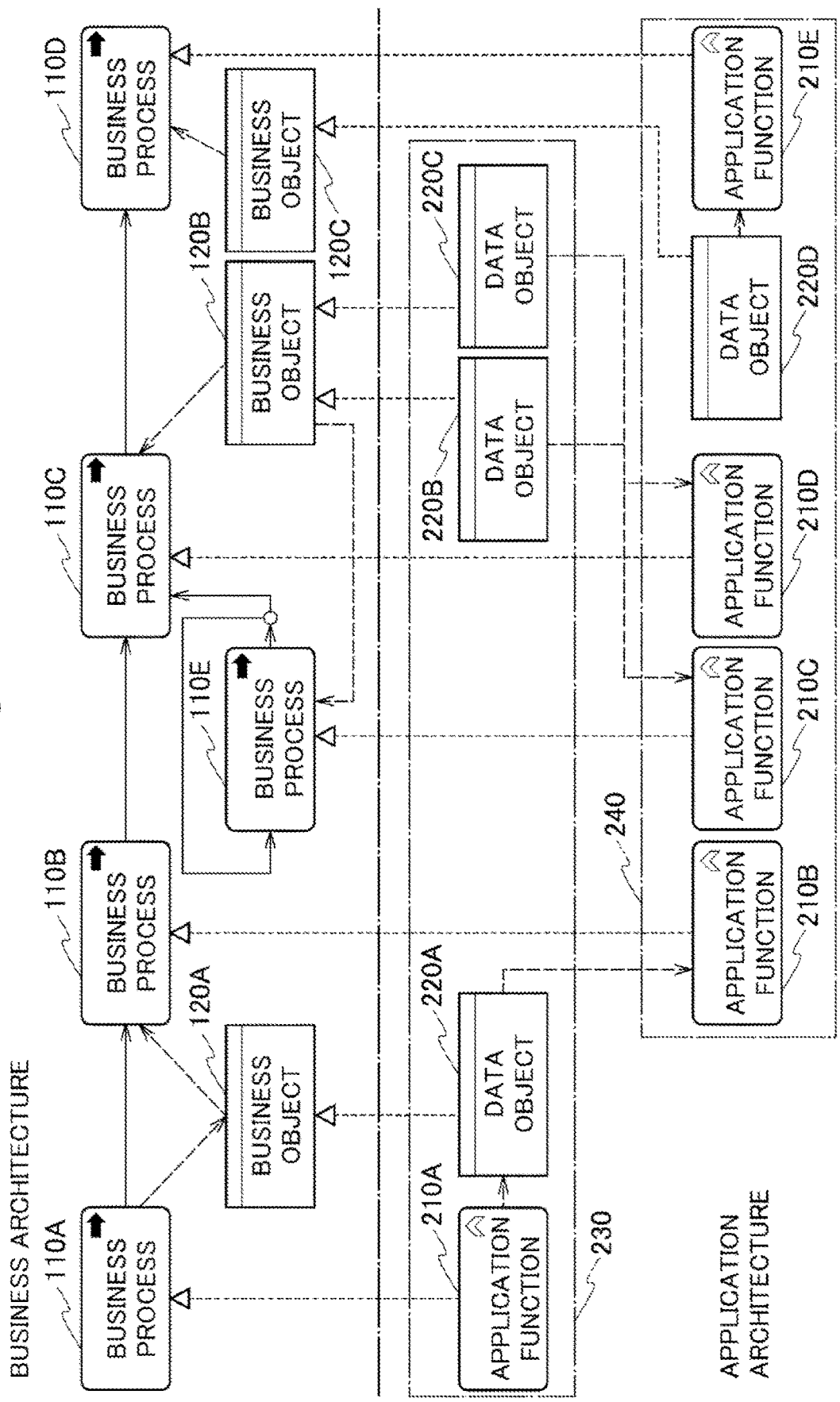
FIG. 6 illustrates an example of an application architecture model generated by an information processing device.

FIG. 6 illustrates an example of the To-Be business architecture model and a To-Be application architecture model. The application architecture model in FIG. 6 is the AA/DA generated by the recommended AA/DA calculation unit 19. The example of FIG. 6 shows application functions 210A to 210E associated with the business processes 110A to 110E and data objects 220A to 220D associated with the business objects 120A to 120C. The application function 210A and the three data objects 220A to 220C surrounded by a frame 230 are the AA element and DA elements used from the As-Is. The four application functions 210B to 210E and the data object 220D surrounded by a frame 240 are the AA elements and DA element built based on the recommended API by the recommended AA/DA calculation unit 19.

Among the business processes of the BA, the business process with which the As-Is AA element is associated is not processed by the recommended AA/DA calculation unit 19. In the example of FIG. 6, the business process 110A with which the As-Is application function 210A is associated is not processed.

The recommended API calculation unit 20 calculates recommendation of each API on the basis of the information received from the recommended AA/DA calculation unit 19 and the information regarding the industry standard APIs held by the API information storage unit 15 and returns the recommended API having the highest recommendation to the recommended AA/DA calculation unit 19.

For example, the recommended API calculation unit 20 calculates similarity between the business process name and the API name, the business process overview and the API overview, the business object name and the resource name, and the business object overview and the resource overview for each API record held by the API information storage unit 15 by a similarity calculation method between two sentences in natural language processing. Note that TF-IDF or the like can be used for vectorization of sentences. The cosine similarity method or the like can be used for calculating the similarity.

Regarding the use of the business objects by the business processes, the recommended API calculation unit 20 quantifies a relationship (similarity) between the use direction and operation of the API record. For example, the recommended API calculation unit 20 sets 1 in a case where the use direction is read and the operation is get, sets 1 in a case where the use direction is write and the operation is post, patch, or delete, and sets 0 in other combinations.

The recommended API calculation unit 20 calculates the recommendation on the basis of the similarity obtained above and obtains a recommended API. For example, the recommended API calculation unit 20 calculates, as the recommendation, a numerical value obtained by multiplying the similarity by a numerical value indicating the use direction.

The matching unit 21 matches the As-Is DA element included in the AA/DA generated by the recommended AA/DA calculation unit 19 and the recommended API calculation unit 20 with the DA element built based on the resource of the recommended API in accordance with the policy stored in the policy storage unit 18. In a case where the As-Is DA element is considered to be more important, the matching unit 21 sets the As-Is DA element included in the AA/DA as the DA element built based on the resource of the recommended API and gives information for replacing some fields of the DA element with fields included in the As-Is DA element. In a case where the recommended API is considered to be more important, the matching unit 21 replaces the As-Is DA element included in the AA/DA with the DA element built based on the resource of the recommended API.

The output unit 22 outputs the AA/DA generated by the recommended AA/DA calculation unit 19 and the recommended API calculation unit 20 in a format that can be read by a tool used by the architect. The tool may be the same as the tool with which the architect has created the BA, and it is possible to confirm a state in which the BA and the AA/DA are associated with each other on the tool. The architect confirms the AA/DA generated by the information processing device 1 and, for example, corrects the AA/DA. In a case where the As-Is DA element is processed by the matching unit 21, the output unit 22 outputs the AA/DA including the DA element processed by the matching unit 21.

In a case where the As-Is AA/DA is not used, the information processing device 1 may not include the AA/DA registration unit 13, the policy registration unit 14, the AA/DA storage unit 17, the policy storage unit 18, or the matching unit 21.

Figure 7:
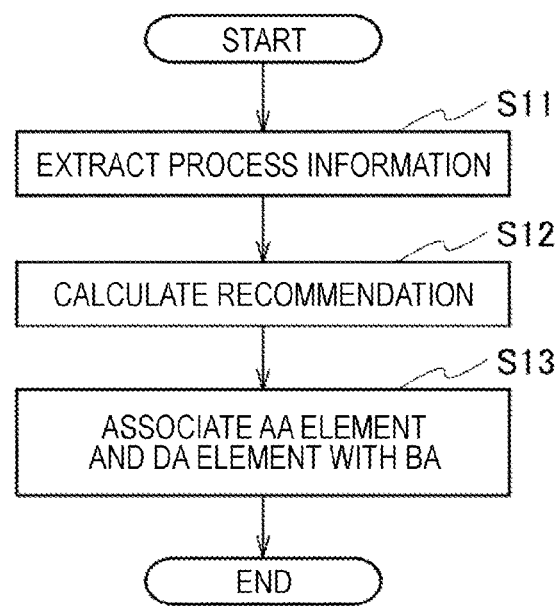
FIG. 7 is a flowchart showing an example of a flow of processing for generating an application architecture model.

Next, AA/DA generation processing by the recommended AA/DA calculation unit 19 and the recommended API calculation unit 20 will be described with reference to a flowchart of FIG. 7. The To-Be BA is held by the BA storage unit 16. The following processing is performed for each business process included in the BA. A business process to which an As-Is application function is associated is not processed. For example, in the example of FIG. 6, the following processing is performed on the four business processes 110B to 110E, excluding the business process 110A.

Figure 8:
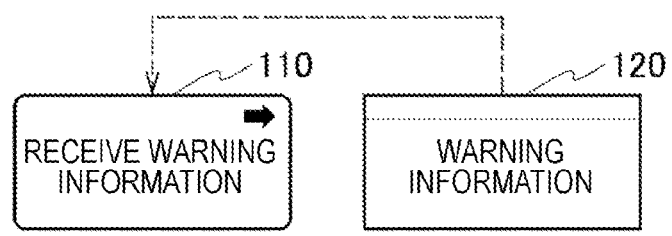
FIG. 8 illustrates an example where a business process and a business object are extracted from a business architecture model.

In step S11, the recommended AA/DA calculation unit 19 extracts information regarding a business process to be processed from the BA storage unit 16. When extracting the information regarding the business process, the recommended AA/DA calculation unit 19 also extracts information regarding a business object used by the business process and a use direction thereof. In the example of FIG. 8, the recommended AA/DA calculation unit 19 extracts "receive warning information" as the business process 110 and extracts "warning information" as the business object 120 used by the business process 110. The recommended AA/DA calculation unit 19 also extracts information (use direction) indicating that the business process 110 reads the business object 120.

In step S12, the recommended API calculation unit 20 calculates recommendation for each API record held by the API information storage unit 15 on the basis of the information extracted in step S11 and information regarding the API record and returns the API record having the highest recommendation to the recommended AA/DA calculation unit 19.

Figure 9:
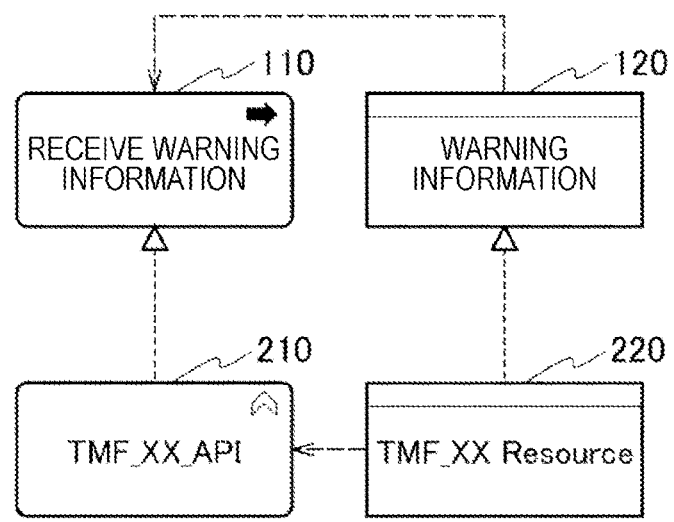
FIG. 9 illustrates an example where an application function and a data object are associated with the business process and the business object in FIG. 8.

In step S13, the recommended AA/DA calculation unit 19 builds an AA element and a DA element on the basis of the information regarding the API record received from the recommended API calculation unit 20 and associates the AA element and the DA element with the BA. In the example of FIG. 9, the recommended AA/DA calculation unit 19 acquires an industry standard name, an API name, and a resource name from the recommended API record, builds an application function 210 to which a character string of "TMF XX API" including the industry standard name and the API name has been given, associates the application function with the business process 110, builds a data object 220 to which a character string of "TMF XX Resource" including the industry standard name and the resource name has been given, and associates the data object with the business object 120. The architect can determine which API to use on the basis of the character strings given to the application function 210 and the data object 220. The application function 210 and the data object 220 may include information regarding the recommended API record or may include information regarding a resource record.

Figure 10:
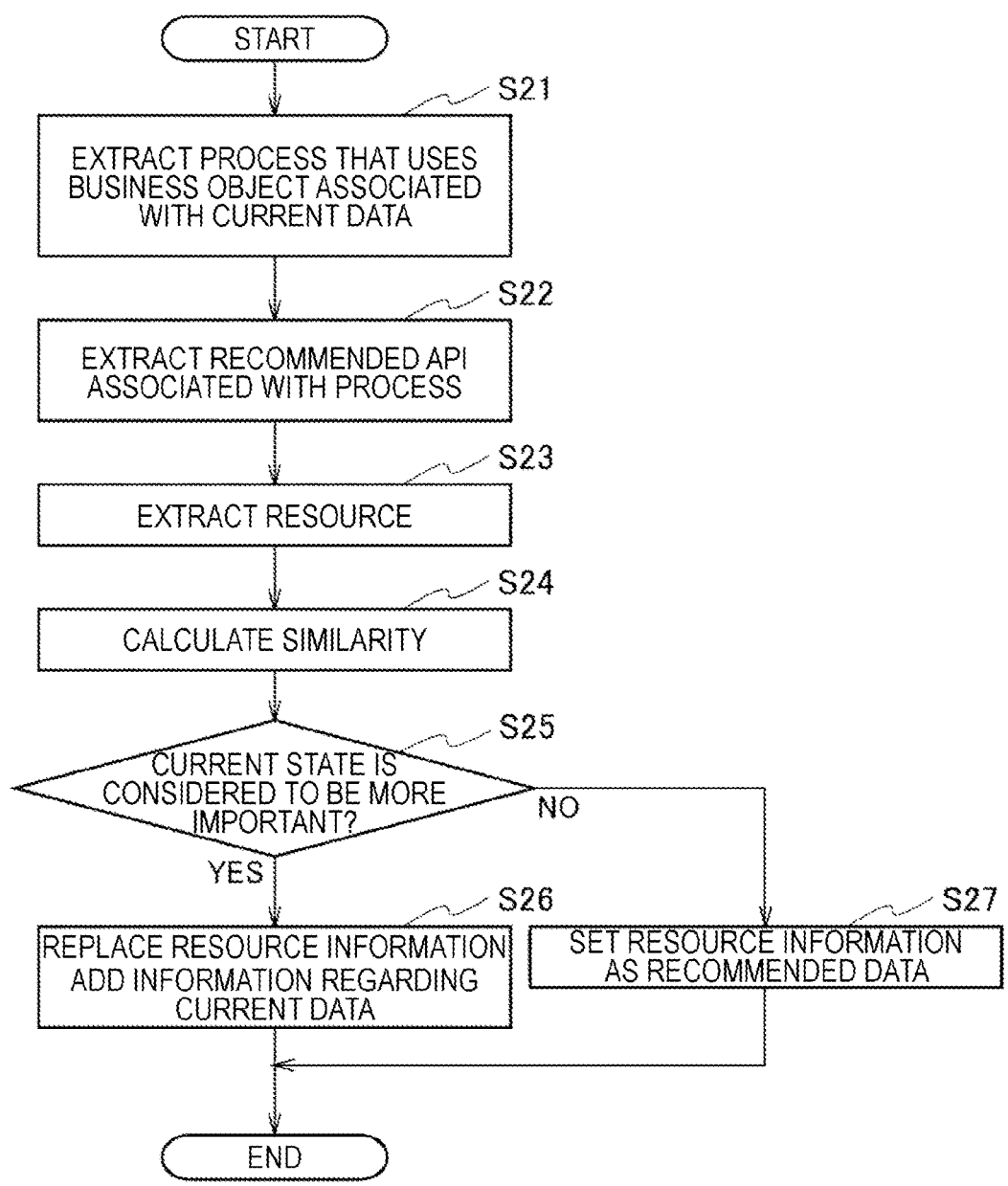
FIG. 10 is a flowchart showing an example of a flow of processing for matching data objects.

Next, matching processing of the As-Is data object by the matching unit 21 will be described with reference to a flowchart of FIG. 10. The following processing is performed on all the As-Is data objects included in the AA/DA generated by the recommended AA/DA calculation unit 19. For example, in the example of FIG. 6, the processing is performed on the three data objects 220A, 220B, and 220C in the frame 230.

In step S21, the matching unit 21 extracts a business process that uses a business object associated with the As-Is data object. For example, regarding the data object 220A of FIG. 6, the two business processes 110A and 110B that use the business object 120A associated with the data object 220A are extracted.

In step S22, the matching unit 21 extracts a recommended API of an application function associated with the business process extracted in step S21 by the recommended AA/DA calculation unit 19. For example, in the example of FIG. 6, a recommended API of the application function 210B associated with the business process 110B is extracted. The recommended API can be extracted by using an industry standard name and an API name given to the application function 210B. Note that the application function 210A associated with the business process 110A is an As-Is application function and is not built by the recommended AA/DA calculation unit 19.

In step S23, the matching unit 21 extracts a resource with reference to the API record of the recommended API. Specifically, the matching unit 21 extracts a resource record corresponding to a resource ID of the API record. In a case where a sub-resource ID is designated in the resource record, the matching unit 21 also recursively extracts the resource record of the resource ID. For example, because the resource ID=1 is designated in the API record of the API ID=1 in FIG. 2, the matching unit 21 extracts the resource record of the resource ID=1 in FIG. 3 and further extracts the resource record of the sub-resource ID=5.

Figure 11:
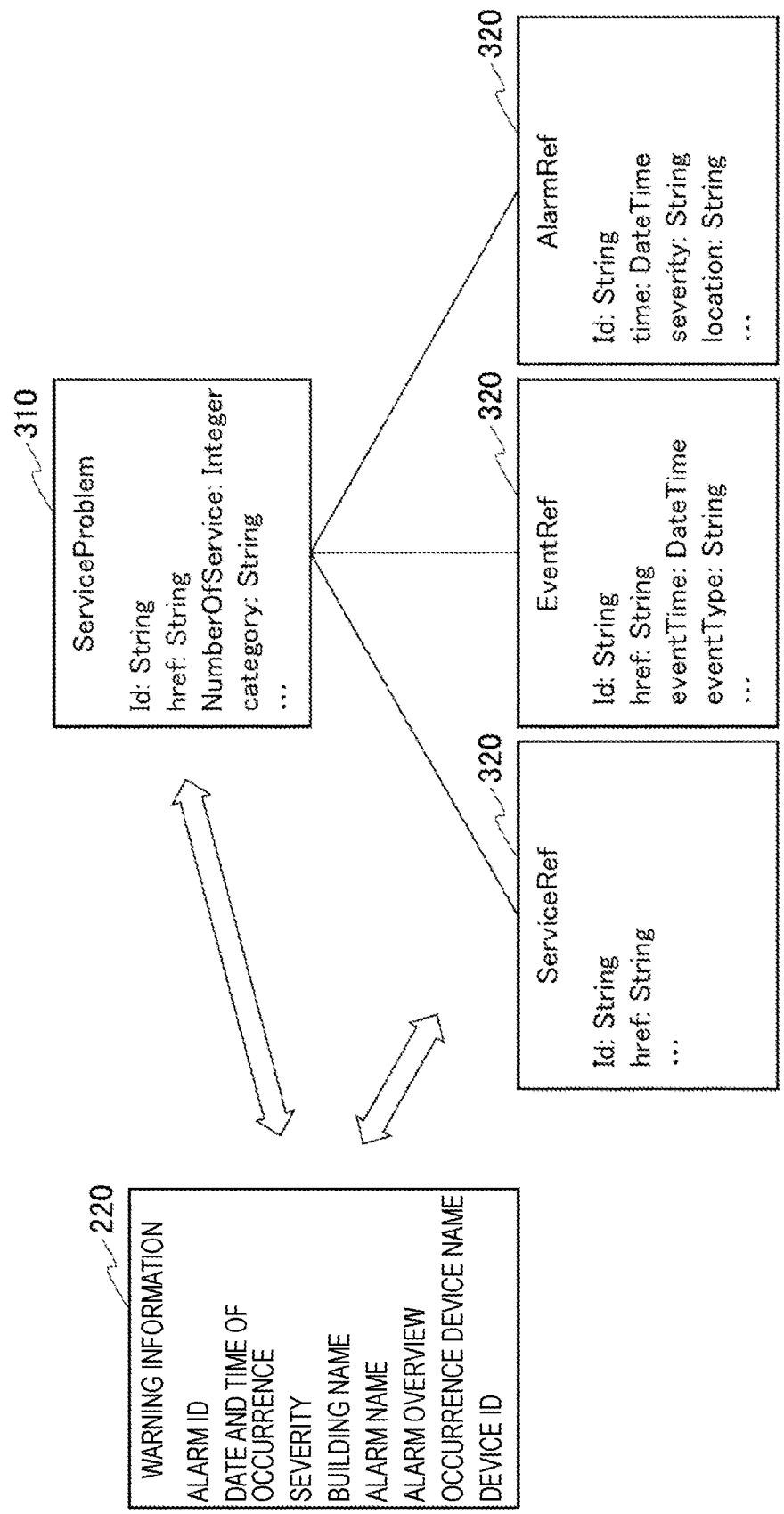
FIG. 11 illustrates an image of an example where similarity is calculated among a data object, a resource, and sub-resources.

In step S24, the matching unit 21 calculates similarity among the As-Is data object, each resource, and each sub-resource extracted in step S23 and sets a resource or sub-resource having the highest similarity as a target to match with the As-Is data object. FIG. 11 illustrates an image of calculating similarity among the As-Is data object 220, a resource 310, and sub-resources 320. The matching unit 21 compares each field of the data object 220 with each field of the resource 310 and the sub-resources 320 and calculates the similarity to the resource 310 and the similarity to each sub-resource 320. For example, the matching unit 21 calculates the similarity to the resource 310 and the similarity to the sub-resource 320 on the basis of the type of the field, the similarity of the name of the field, and the like. The resource 310 or the sub-resource 320 having the highest similarity is set as the target to match with the data object 220.

In step S25, the matching unit 21 refers to a policy registered in the policy storage unit 18 and determines which is considered to be more important, the As-Is or the resource of the recommended API.

Figure 12:
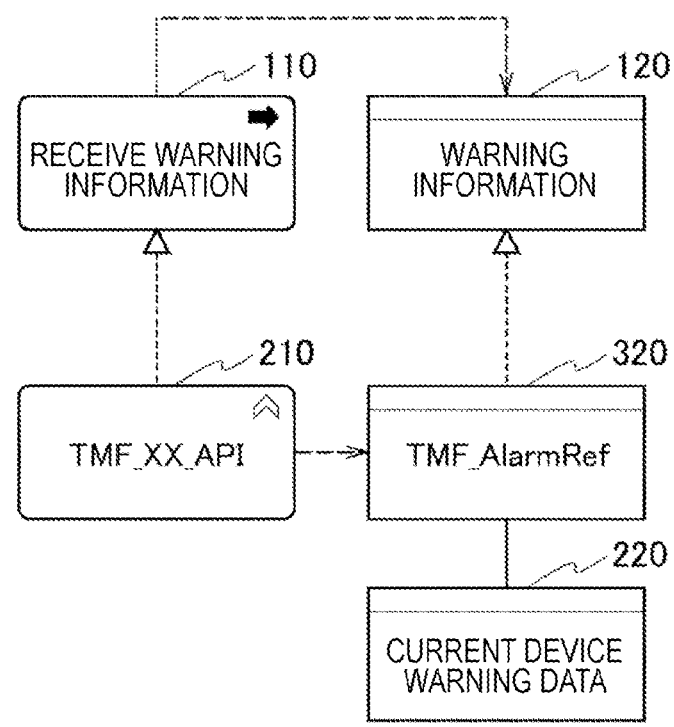
FIG. 12 illustrates an example where information regarding a current data object is given to a data object built based on a resource of a recommended API.

In a case where the As-Is is considered to be more important, the matching unit 21 builds a new data object by using the matching target resource or sub-resource obtained in step S24 and gives correspondence information for replacing a field of the new data object with the field of the As-Is data object. In the example of FIG. 12, the matching unit associates the data object built based on the sub-resource 320 with the business object 120 and gives information for replacing some fields of the sub-resource 320 with the fields of the As-Is data object 220.

Figure 13:
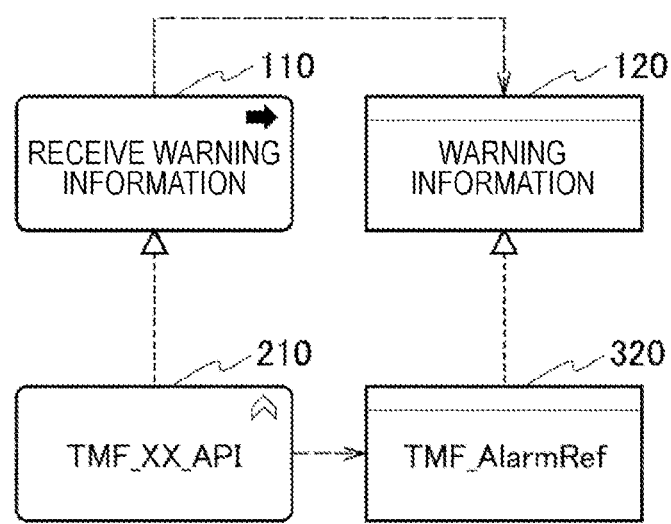
FIG. 13 illustrates an example where a current data object is replaced with a data object built based on a resource of a recommended API.

When the resource of the recommended API is considered to be more important, the matching unit 21 replaces the As-Is data object with a new data object built based on the matching target resource or sub-resource obtained in step S24. In the example of FIG. 13, the business object 120 is associated with the data object built based on the sub-resource 320.

As described above, the information processing device 1 of the present embodiment includes the API information storage unit 15 that holds information regarding industry standard APIs. For each business process included in a business architecture model, the recommended AA/DA calculation unit 19 extracts information regarding a business process and information regarding a business object used by the business process from the business architecture model. The recommended API calculation unit 20 calculates recommendation of the business process for each industry standard API. The recommended AA/DA calculation unit 19 generates an application architecture model and a data architecture model by building an application function based on a name of the industry standard API having the highest recommendation, associating the application function with the business process, building a data object based on a name of a resource used by the industry standard API having the highest recommendation, and associating the data object with the business object. This makes it possible to generate the application architecture model and the data architecture model using the industry standard API.

Figure 14:
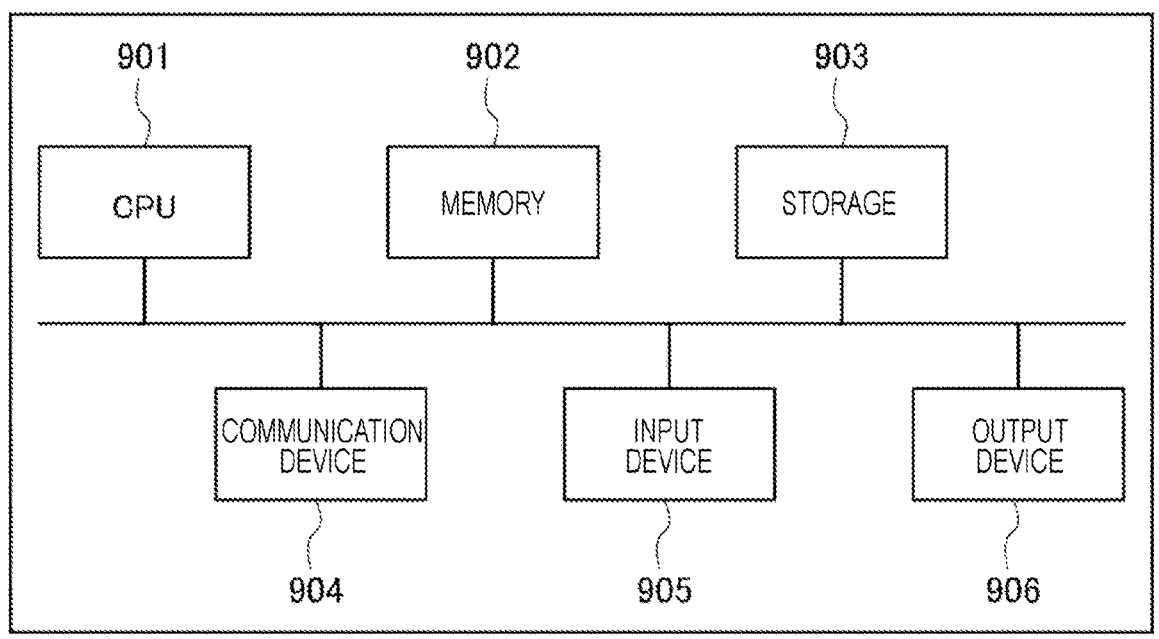
FIG. 14 illustrates an example of a hardware configuration of an information processing device.

The information processing device 1 described above can be, for example, a general-purpose computer system including a central processing unit (CPU) 901, a memory 902, a storage 903, a communication device 904, an input device 905, and an output device 906 as illustrated in FIG. 14. In the computer system, the CPU 901 executes a predetermined program loaded on the memory 902, thereby implementing the information processing device 1. The program can be recorded on a computer-readable recording medium such as a magnetic disk, an optical disk, or a semiconductor memory or can be distributed via a network.

REFERENCE SIGNS LIST

1 Information processing device
11 API information registration unit
12 BA registration unit
13 AA/DA registration unit
14 Policy registration unit
15 API information storage unit
16 BA storage unit
17 AA/DA storage unit
18 Policy storage unit
19 Recommended AA/DA calculation unit
20 Recommended API calculation unit
21 Matching unit
22 Output unit

The invention claimed is:

1. An information processing device configured to generate an application architecture model and a data architecture model on the basis of a business architecture model in which a process and an object have been modeled on the basis of a business requirement, the information processing device comprising:
   a memory configured to hold information regarding industry standard application programming interfaces (APIs); and
   a processor configured to generate the application architecture model and the data architecture model by extracting, for each process included in the business architecture model, information regarding the process and information regarding the object used by the process from the business architecture model, calculating recommendation for each of the industry standard APIs, building an application architecture (AA) element based on a name of the industry standard API having the highest recommendation, associating the AA element with the process, building a data architecture (DA) element based on a name of a resource used by the industry standard API having the highest recommendation, and associating the DA element with the object.

2. The information processing device according to claim 1, wherein
   the processor is configured to calculate the recommendation for each of the industry standard APIs on the basis of similarity between the information regarding the process and the information regarding the industry standard API, similarity between the information regarding the object and the resource used by the industry standard API, and a relationship between a use relationship between the process and the object and an operation of the industry standard API.

3. The information processing device according to claim 1, wherein the processor is further configured to:
   input a current application architecture model and a current data architecture model and associates a current AA element and a current DA element included in the current application architecture model and the current data architecture model with the process and the object included in the business architecture model; and
   match the application architecture model generated by the processor, the current DA element included in the data architecture model, and the resource used by the industry standard API with one another.

4. The information processing device according to claim 3, wherein the processor is further configured to
   extract the process that uses the object associated with the current DA element, extract the AA element built based on the industry standard API from the AA elements associated with the process, and match the resource used by the industry standard API corresponding to the extracted AA element with the current DA element.

5. The information processing device according to claim 4, wherein the processor is further configured to
   replace the current DA element with a new DA element built based on the resource used by the industry standard API and give correspondence information between information that the new DA element has and information that the current DA element has to the new DA element.

6. An information processing method of generating an application architecture model and a data architecture model on the basis of a business architecture model in which a process and an object have been modeled on the basis of a business requirement, the method comprising:
   holding information regarding industry standard application programming interfaces (APIs), and
   generating the application architecture model and the data architecture model by extracting, for each process included in the business architecture model, information regarding the process and information regarding the object used by the process from the business architecture model, calculating recommendation for each of the industry standard APIs, building an application architecture (AA) element based on a name of the industry standard API having the highest recommendation, associating the AA element with the process, building a data architecture (DA) element based on a name of a resource used by the industry standard API having the highest recommendation, and associating the DA element with the object.

7. One or more processors coupled to a memory storing instructions that, when executed, cause the one or more processors to perform operations comprising:
   storing information regarding industry standard application programming interfaces (APIs) in the memory; and
   generating the application architecture model and the data architecture model by extracting, for each process included in the business architecture model, information regarding the process and information regarding the object used by the process from the business architecture model, calculating recommendation for each of the industry standard APIs, building an application architecture (AA) element based on a name of the industry standard API having the highest recommendation, associating the AA element with the process, building a data architecture (DA) element based on a name of a resource used by the industry standard API having the highest recommendation, and associating the DA element with the object.

\* \* \* \* \*